United States Patent Office 2,888,454
Patented May 26, 1959

2,888,454

1-TRIMETHYLSILOXY-1-METHYL-1,2-SILOXACY-CLOPENTANE

Donald L. Bailey, Snyder, N.Y., assignor to Union Carbide Corporation, a corporation of New York No Drawing. Application December 17, 1957
Serial No. 703,247

1 Claim. (Cl. 260—239)

This invention relates to a novel organosilicon compound. More particularly, the invention contemplates the provision of the specific organosilicon compound, 1-trimethylsiloxy-1-methyl-1,2-siloxacyclopentane, as represented by the following structural formula:

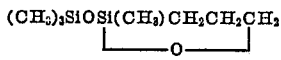

The invention is based on my discovery that the foregoing siloxane-cyclic ester structure can be synthesized by the thermal or catalytic dehydration of gamma-hydroxypropyl-bis(trimethylsiloxy) methylsilane as illustrated by the following equation:

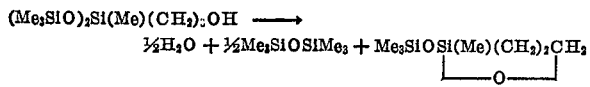

The starting material gamma-hydroxypropyl-bis(trimethylsiloxy) methylsilane used in the production of the novel compound of the invention is described and claimed in my copending application Serial No. 703,244, which was filed of even date with this application. The compound may be produced by the thermal addition of hepamethyltrisiloxane to allyl alcohol in the presence of a platinum catalyst. In essence, this synthesis involves the formation of a reaction mixture comprising the heptamethyltrisiloxane, allyl alcohol, and a small amount of a platinum catalyst, followed by heating of the reaction mixture to cause the components to react under influence of the platinum catalyst to effect decomposition of the silanic hydrogen bond of the siloxane and addition of the resulting silyl and hydrogen free radicals to respective carbon atoms of the carbon to carbon multiple bond of the allyl alcohol, with the production of the desired compound as an adduct of the component reactants.

It is found that on heating the foregoing adduct to a temperature within the range 200–260° C., or by using an alkaline catalyst at a lower temperature (110° C.), dehydration proceeds readily to form the internal cyclic ester. The novel compound of the invention may be obtained, also, from the adduct of $$Me_3SiO(MeSiHO)_2SiMe_3$$

and allyl alcohol by dehydration and rearrangement at 110° C. in the presence of an alkaline catalyst such as potassium hydroxide. This synthesis may be represented by the following equations:

(a)

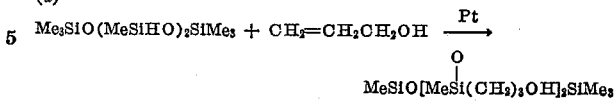

(b)

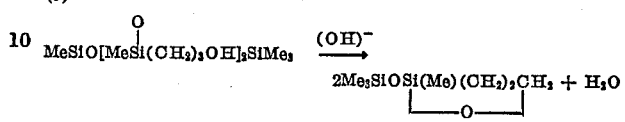

The cyclic silicone ester of the invention is extremely reactive and hydrolyzes readily upon contact with moisture. The compound is useful as an intermediate in the preparation of silicone polymers containing hydroxyl groups and finds particular application as an intermediate for introducing silicon functional groups into alkyd resins or other organic systems which are reactive towards the hydroxyl group.

It is believed that the invention may be best understood by reference to the following specific example describing the foregoing principles and procedures as applied to the production of the novel compound of the invention:

EXAMPLE

*Preparation of 1-trimethylsiloxy-1-methyl-1,2-siloxacyclopentane*

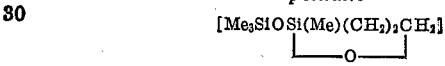

Into a 250 cubic centimeter flask connected to a fractionating column there was placed 54 grams (0.19 mole) of $(Me_3SiO)_2SiMe(CH_2CH_2CH_2OH)$. The compound was heated at 210–260° C. for six (6) hours during which time the following fractions were collected at the head of the column:

| Fraction | B.P., °C. | Wt. (g.) | $n_D^{25}$ | Cryoscopic Mol. Wt. |
|---|---|---|---|---|
| 1 | 98–103 | 9.5 | 1.3848 | |
| 2 | 103–154 | 21 | | |
| 3 | 154–156 | 15 | 1.4260 | 209 (Theory 190). |

Fraction 3 was identified as the compound.

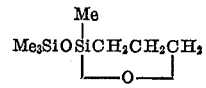

Analysis also showed:

|  | Molar refract. |
|---|---|
| Found | 51.84 |
| Theoretical | 52.18 |

Having thus described the subject matter of my invention, what it is desired to secure by Letters Patent is:

1-trimethylsiloxy-1-methyl-1,2-siloxacyclopentane, as represented by the formula:

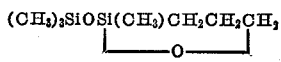

No references cited.

UNITED STATES PATENT OFFICE
Certificate of Correction

Patent No. 2,888,454

May 26, 1959

Donald L. Bailey

It is hereby certified that error appears in the printed specification of the above numbered patent requiring correction and that the said Letters Patent should read as corrected below.

Column 2, lines 6 to 8, and lines 9 to 11, for

each occurrence, read

Signed and sealed this 22nd day of March 1960.

[SEAL]

Attest:
KARL H. AXLINE,
Attesting Officer.

ROBERT C. WATSON,
Commissioner of Patents.